United States Patent Office 3,826,629
Patented July 30, 1974

---

3,826,629
PRODUCTS FORMED OF GLASS OR CERAMIC-METAL COMPOSITES
Michael J. Pryor, Woodbridge, and James M. Popplewell, Guilford, Conn., assignors to Olin Corporation
Continuation-in-part of applications Ser. No. 78,899, Oct. 7, 1970, now Patent No. 3,676,292, Ser. No. 231,834, Mar. 6, 1972, and Ser. No. 254,666 May 18, 1972. This application July 7, 1972, Ser. No. 269,768
Int. Cl. B23p 3/00; B32b 3/02
U.S. Cl. 29—195         21 Claims

ABSTRACT OF THE DISCLOSURE

Articles having an aesthetically pleasing appearance and improved durability. The articles include plumbing fixtures, electrical fixtures, bathroom fixtures, household utensils, picture frames, jewelry, etc. The articles are formed of a glass or ceramic-metal composite comprising a glass or ceramic component bonded to a copper base alloy component. The copper base alloy component comprises about 2 to 12% aluminum and the balance essentially copper. Additional mechanical support may be provided by a backing, of metal plastic or wood affixed to the composite.

---

CROSS REFERENCES TO RELATED APPLICATIONS

This application is a continuation-in-part of copending applications Ser. Nos. 78,899, filed Oct. 7, 1970, now U.S. Pat. No. 3,676,292; 231,834, filed Mar. 6, 1972; and 254,666, filed May 18, 1972.

BACKGROUND OF THE INVENTION

Copper and copper base alloys are employed in many products because of their aesthetically pleasing appearance. They have been used in plumbing fixtures, electrical fixtures, bathroom fixtures, household utensils, picture frames and jewelry to name just a few.

It is well known that copper and copper base alloys rapidly tarnish in most atmospheres to produce oxides and compounds of copper which detract from their aesthetic appearance and, therefore, require mechanical or chemical cleaning to restore their pleasing and decorative appearance.

Various coatings of paints or lacquers have been applied to the surfaces of the metals in order to provide tarnish and oxidation resistance. However, these paints and lacquers generally are not very durable. This lack of durability often results in exposing various areas of the underlying metal surface which in turn leads to selective corrosion attack of the metal at the exposed areas.

In U.S. Pat. No. 3,676,292, and U.S. application Ser. No. 231,834, filed Mar. 6, 1972, there are disclosed glass or ceramic-to-metal composites comprising a glass or ceramic component bonded to a copper base alloy component comprising 2 to 12% aluminum and the balance essentially copper. Alternatively, the copper base alloy component may itself be a composite of the aforenoted copper base alloy and an alloy of different composition and further including a decorative pattern in one of the alloy components.

In accordance with this invention, the glass or ceramic component provides a very durable and corrosion resistant surface and, therefore, these composites are uniquely suited for use in a variety of articles where an aesthetically pleasing appearance is desired.

SUMMARY OF THE INVENTION

In accordance with this invention the glass or ceramic-to-metal composites disclosed in U.S. Pat. No. 3,676,292 and U.S. application Ser. No. 231,834 are employed in articles having an aesthetically pleasing appearance. Generally these articles are also of a decorative nature.

The invention includes a wide variety of such articles as, for example, plumbing fixtures, such as sinks, bath tubs, shower stalls, toilets, faucets, escutcheons, etc.; bathroom fixtures, such as soap dishes, tooth brush holders, towel holders, toilet paper holders, etc.; electrical fixtures, such as lighting fixtures and lamp bases, etc.; household articles, such as kitchen utensils, pots, pans, etc.; picture frames; jewelry; counter tops; appliance cabinets and a wide variety of other similar type articles.

For most applications, the aforenoted composites may be used without any backing. However, for other applications requiring additional mechanical support a backing of metal, plastic or wood may be affixed to the composite. Preferably when a backing member is employed, it is a polymeric foam, particularly, a polyurethane foam and, most particularly, a rigid polyurethane foam.

The glass or ceramic-to-metal composite in accordance with this invention is unique in that it has been found that the copper base alloy component within certain ranges of composition forms on its surface an oxide layer, one compound of which is $Al_2O_3$ in the form of a compact continuous film. The $Al_2O_3$ film forms immediately adjacent to the metal surface and is strongly adherent to it. The $Al_2O_3$ film comprises at least 10% of the total oxide film thickness. When the glass or ceramic component is bonded to the copper base alloy component having the $Al_2O_3$ film, a strong bond results.

This high bond strength between the copper base alloy component and the glass or ceramic component allows composites to be fabricated which can tolerate a high degree of mismatch of coeffiicent of expansion between the glass or ceramic component and the copper base alloy component. Further, where this degree of mismatch can be minimized, a glass or ceramic-to-metal composite is formed having unusually good adherence of the glass or ceramic to the metal due to the high bond strength between the components of the composite.

Therefore, in accordance with this invention, articles are provided having an aesthetically pleasing appearance, the articles being formed from a glass or ceramic-to-metal composite wherein the metal is a copper base alloy containing from about 2 to 12% aluminum and the balance essentially copper.

It is another object of this invention to provide articles as above formed of a glass or ceramic metal composite wherein the metal component is a composite of the aforenoted copper base alloy and an alloy of differing composition and further including a decorative pattern in one of the alloy components.

It is a further object of this invention to provide specific articles formed from the aforenoted composites.

Other objects and advantages will become apparent to those skilled in the art as a detailed description proceeds with reference to the drawings.

DESCRIPTION OF THE PREFERRED EMBODIMENTS

Figure 1:
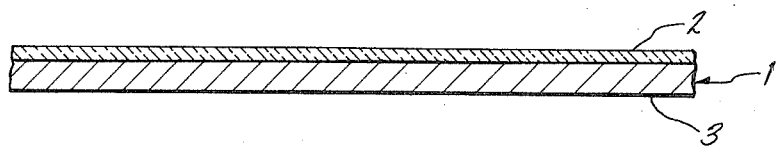
FIG. 1 is a cross section of a glass or ceramic-to-metal composite in accordance with one embodiment of this invention.

This invention is directed to articles having an aesthetically pleasing appearance and, preferably, of a decorative nature. The articles are formed from a glass or ceramic-to-metal composite wherein the metal is a copper base alloy having from about 2 to 12% aluminum and the balance essentially copper or a composite of that copper base alloy and another metal with a decorative pattern formed throughout the thickness of one of the components of the metal composite. The glass or ceramic-to-metal composites of this invention provide an aesthetically pleasing appearance in the articles formed therefrom and have improved durability and resistance to corrosion and tarnishing.

Suitable copper base alloys for use in the glass or ceramic-to-metal composite facing of this invention preferably contain from about 2 to 10% aluminum, from about 0.001 to 3% silicon, up to about 35% zinc and a grain refining element selected from the group consisting of iron up to about 4.5%, chromium up to about 1%, zirconium up to about 0.5%, cobalt up to about 1% and mixtures of these grain refining elements.

In particular, C.D.A. Alloy 638 containing 2.5 to 3.1% aluminum, 1.5 to 2.1% silicon and 0.25 to 0.55% cobalt, balance essentially copper, and C.D.A. Alloy 688 containing 2.8 to 4.0% aluminum, 21 to 24.5% zinc and 0.1 to 1% cobalt, balance essentially copper are most preferred for use in the articles of this invention.

Impurities may be present in amounts not adversely affecting the properties of the glass or ceramic-to-metal composite facing of this invention. In particular, the impurities may include less than 1% nickel, less than 1% manganese, less than 1% tin, less than 0.5% lead, less than 0.1% phosphorus and less than 0.1% arsenic. The aforenoted limitations of impurity elements apply to those elements only when they are present as impurities and not if they are used as alloying elements.

The aforenoted copper base alloys form on their exposed surfaces an oxide, one component of which is $Al_2O_3$ in the form of a thin compact continuous film. The $Al_2O_3$ film forms immediately adjacent to the metal, is strongly adherent to it and comprises at least about 10% and up to about 100% of the total thickness of the oxide.

Alumina seals efficiently to most glasses and ceramics. Therefore, since the alumina film formed on the alloys used with this invention is tightly adherent to the alloys, an excellent glass or ceramic-to-metal bond is produced.

The alumina film on the alloys in accordance with this invention may be formed by any conventional techniques as are known in the art. It may be formed during the coating of the alloy component with the glass or ceramic component or the alloy component may be preoxidized by conventional techniques such as heating the alloy component to a temperature in the range of 200 to 700° C. for a period of time of at least 2 seconds. Normally, however, the alumina film is formed on the surface of the alloy component during the coating of the alloy with the glass or ceramic.

Any well known glass or ceramic which will readily fuse with the alumina film on the metal surface may be used as the glass or ceramic in the composite facing of this invention. However, the mismatch in coefficient of thermal expansion between the metal component and the glass component should be less than $100 \times 10^{-7}$ in./in./° C., and preferably, less than $75 \times 10^{-7}$ in./in./° C. and, more preferably, less than $60 \times 10^{-7}$ in./in./° C.

It is one of the unique aspects of the glass or ceramic-to-metal composite of this invention that is able to tolerate a substantial mismatch in coefficient of expansion between the glass or ceramic and the metal component. If stronger and/or more elastic glasses or ceramics are developed even greater degrees of mismatch than above noted could be tolerated.

Table I lists various exemplary glasses and ceramics which are adapted for use in accordance with this invention.

Table I

| Glass or ceramic type: | Coefficient of Thermal expansion, in./in./° C. |
|---|---|
| Most preferred: | |
| Corning [1]—Code No. 7047 (Barium Silicate Glass) | $140 \times 10^{-7}$ |
| Ferro corporation [1] No. EN-701-A (Clear Porcelain) (approximately) | $160 \times 10^{-7}$ |
| Preferred: | |
| Owens-Illinois [1] No. 00583 (Sealing Glass) | $117 \times 10^{-7}$ |
| Borosilicate clear porcelain,[2] 50% $SiO_2$, 20% $B_2O_3$, 12.5% Cryolite, 10% BaO, 2.5% ZnO, 2.5% $K_2O$, 2.5% $Na_2O$ (approximately) | $72 \times 10^{-7}$ |
| Least preferred: | |
| G.E.[1]—ReX (Sealing Glass) | $90 \times 10^{-7}$ |
| Soda—Lime—Silica glass,[2] 70% $SiO_2$, 11% CaO, 14% $Na_2O$, +$Al_2O_3$+MgO | $90 \times 10^{-7}$ |
| Porcelain,[2] 40% Leucite ($K_2O$, $Al_2O_3$, $4SiO_4$), 30% Mullite ($3Al_2O_3$, $2SiO_2$) 30% $SiO_2$ | $60 \times 10^{-7}$ |
| Sealing glass type 101,[2] ASTM No. F-79-67T, 56% $SiO_2$, 1.5% $Al_2O_3$, 4.0% $K_2O$, 29.0% PbO | $92 \times 10^{-7}$ |

[1] Proprietary composition.
[2] Values in weight percent.

The proprietary glass Code No. 7047 manufactured by the Corning Glass Company, Corning, N.Y. has a coefficient of thermal expansion which is close to that of Alloy 638 and, therefore, in accordance with the most preferred embodiment of this invention, it is desirable to employ this particular type of glass.

It has also been found that additions of 2 parts boric acid, 1.35 parts KOH, 9.3 parts potassium silicate, 0.5 parts silicic acid per 100 parts of the clear porcelain No. EN-701-A manufactured by the Ferro Corporation, Cleveland, Ohio is beneficial in accordance with this invention.

It has been found that various glasses and ceramics can be employed in this invention and the examples set forth in Table I are not meant to be limitive of the invention.

Preferably, the glass or ceramic component should be clear and transparent so that the full aesthetic appearnce of the underlying copper base alloy component shows through; however, the invention is not limited thereto. For example, additions of various compounds to glasses or ceramics are known to cause them to be tinted or colored and, therefore, it is possible to change the color exhibited by the facing of this invention by the addition of such compounds to the glass or ceramic component.

These compounds may include but are not limited to $MnO_2$, $Fe_2O_3$, $Cu_2O$, $Co_2O_3$, NiO, $K_2Cr_2O_7$, $Na_2UO_4$, and combinations of these compounds in amounts from 0.1% to about 10% by weight. The use of such additions provides colored facings which vary in color depending on the glass or ceramic which is employed and the particular compounds added thereto. It is possible to obtain bronzes, greens, lavenders, blues, etc., and in particular, the addition of $MnO_2$ to the Borosilicate Clear Porcelain of Table I yielded a purple tint.

Figure 2:
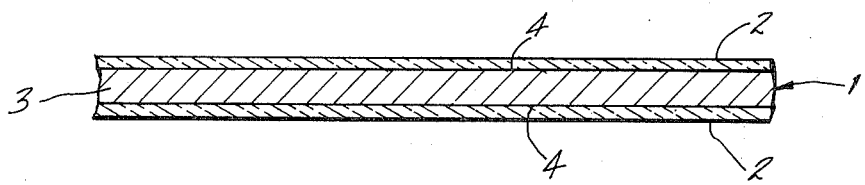
FIG. 2 is a cross section of a glass or ceramic-to-metal composite in accordance with a further embodiment of this invention.
Figure 3:
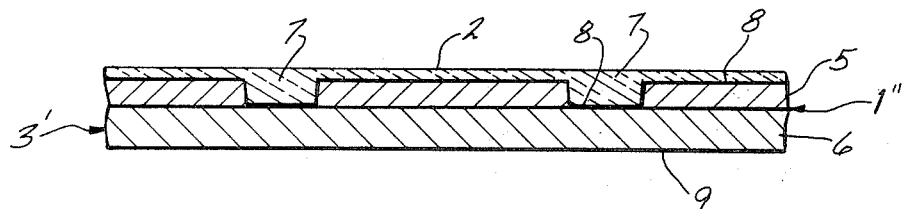
FIG. 3 is a cross section of a glass or ceramic-to-metal composite in accordance with a still further embodiment of this invention.

Referring now to the drawings and especially to FIGS. 1 through 3, there are shown exemplary glass or ceramic-to-metal composites 1, 1', 1" useful in the articles of this invention.

FIG. 1 shows the most basic composite 1 which comprises a glass or ceramic component 2 bonded to a copper base alloy component 3 as aforenoted. FIG. 2 shows a composite 1' with a glass or ceramic component 2 bonded to both major faces 4 of the copper base alloy component 3.

FIG. 3 shows a composite 1" typical of that disclosed in U.S. application Ser. No. 231,834. This composite 1" differs from the composite 1 of FIG. 1 in that the metal component 3' is itself a composite of a first metal component 5 of a copper base alloy within the aforenoted ranges of composition and at least one second metal component 6 of a different composition from the first metal component 5. A decorative pattern 7 as exampled in FIG. 16 and shown in section in the present figure is present in at least one of the metal components 5 or 6 and extends throughout the thickness of that component so as to expose the other metal component 5 or 6. The glass or ceramic component 2 in accordance with this embodiment is formed over substantially the entire surface 8 of the metal composite 3' having the decorative pattern 7. If the metal component 6 comprises the copper base alloy as in accordance with this invention then it is also possible to have a glass or ceramic component 2 bonded on the opposing surface 9 of the composite 1" if desired.

Preferably in the composite of FIG. 3, at least 70% of the surface area 8 which the glass or ceramic component 2 covers comprises a copper base allow within the ranges of this invention. It is also possible if desired to provide further metal components 5 or 6 and decorative patterns 7 on the surface 9 of the composite 1".

Generally, the composite 1 of FIG. 1 would be employed for most articles in accordance with this invention since only the outside surface of most articles is visible and requires the aesthetically pleasing appearance. However, in certain articles such as kitchen utensils where the inside and outside surfaces are visible or where more than one major surface is visible, the composite 1' of FIG. 2 may be more appropriate. In articles such as jewelry where decorative patterns 7 are desirable, a composite 1" as in FIG. 3 could be advantageously employed.

Figure 6:
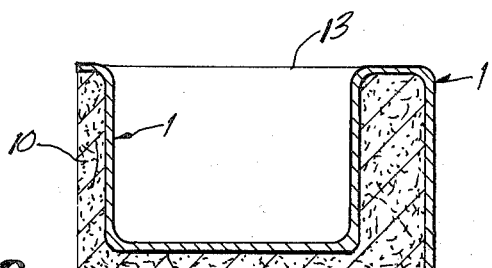
FIG. 6 is a cross section of a bath tub taken along the line 6—6 in FIG. 5.

For some applications, further structural support may be required than can be provided by the metal component 3 or 3' of the composites in accordance with the instant invention. In such a case, the composites may include a backing member 10 as shown in FIG. 6, which can be metal, wood or plastic. A preferred backing member 10 material is a polymeric foam, practicularly, a polyurethane foam and, most preferably a rigid polyurethane foam.

FIGS. 4 through 16 show a variety of articles having an aesthetically appealing appearance and improved durability by virtue of their being formed of the composites 1, 1', 1" of this invention.

Figure 5:
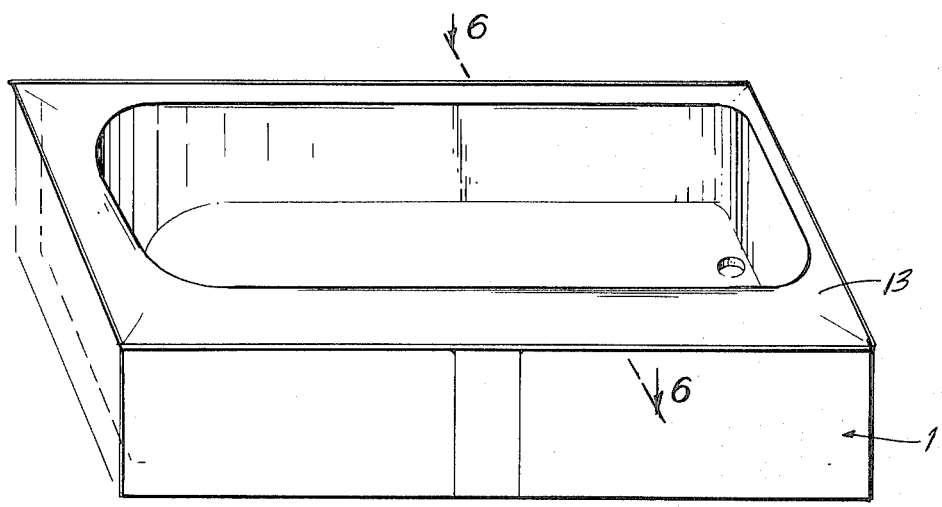
FIG. 5 is a perspective view of a bath tub.
Figure 4:
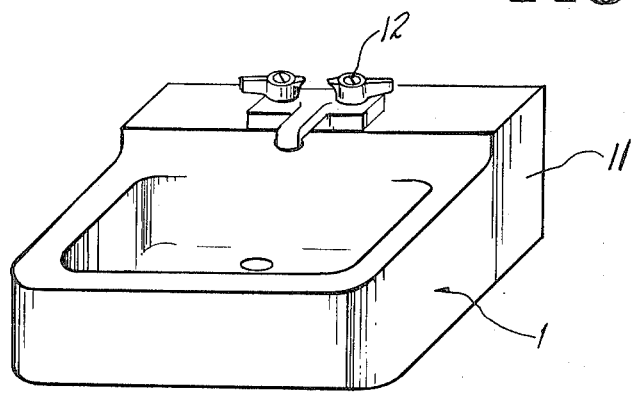
FIG. 4 is a perspective view of a sink and faucet.
Figure 12:
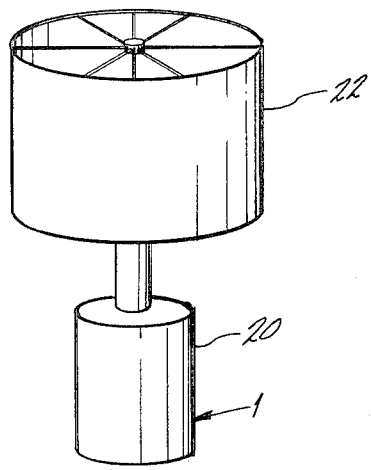
FIG. 12 is a perspective view of a lamp.
Figure 13:
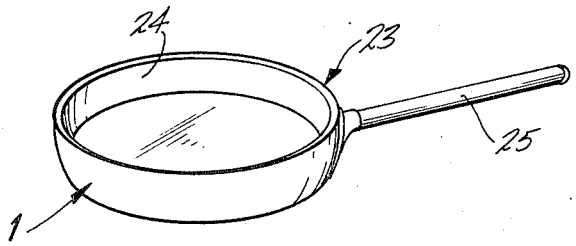
FIG. 13 is a perspective view of a pan.
Figure 14:
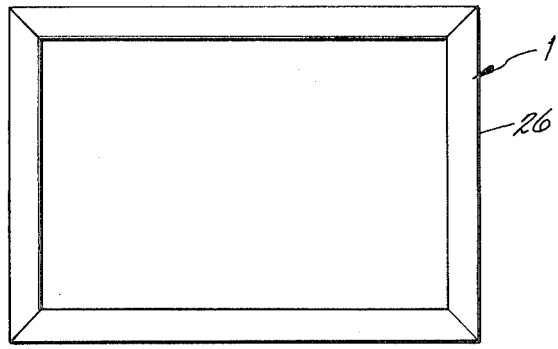
FIG. 14 is a perspective view of a picture frame.
Figure 16:
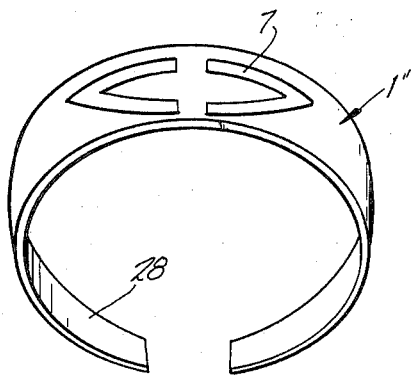
FIG. 16 is a perspective view of a bracelet.
Figure 15:
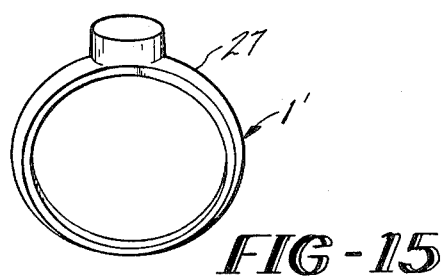
FIG. 15 is a perspective view of a ring.

FIGS. 4 through 6 are examples of plumbing fixtures; FIGS. 7 through 10 are examples of bathroom fixtures; FIGS. 11 and 12 are examples of electrical fixtures; FIG. 13 is an example of a household utensil; FIG. 14 is an example of a picture frame; FIGS. 15 and 16 are examples of jewelry; all formed of composites 1, 1', 1" in accordance with this invention.

The examples shown in FIGS. 4 through 16 are not meant to be exhaustive of the possible uses of the composites 1, 1', 1" but rather exemplify the broad range of their use. Indeed, the composites 1, 1', 1" of this invention are useful in most applications wherein copper or copper base alloys have been employed, generally with a lacquer type coating, to provide articles having an aesthetically pleasing appearance.

The specific structures shown in FIGS. 4 through 16 are merely exemplary and are not meant to be limitive of the invention. Rather each figure represents an example of a type of article in accordance with this invention. The structural shapes shown are indeed well known structural shapes and a wide variety of other well known structural shapes could be employed in their place to provide the same types of articles.

In accordance with this invention it is preferred to form the articles from wrought metals such as sheet by well known forming processes such as stamping, drawing and the like and then coat the formed articles with the glass or ceramic component 2. Alternatively, however, if desired, the metal component 3 or 3' of the articles of this invention could be a cast metal rather than a wrought metal which is then coated with the glass or ceramic.

The glass or ceramic components 2 of the articles of this invention are generally formed by applying the glass or ceramic, for example, in the form of a fine powder or frit to the surface of the metal components of the composites 1, 1', 1" in any conventional manner and then firing the composites 3 or 3' to melt and fuse the glass or ceramic and bond it to the metal component by means of the alumina film on the metal surface. Normally, all deformation or forming of the metal components 3 or 3' is performed prior to the application of the glass or ceramic component 2.

In practice, the most preferred means for applying the glass or ceramic component 2 is to spray a slurry of the glass or ceramic powders or frit in a suitable carrier, such as water, onto the surface of the metal component 3 or 3' and then fire the glass or ceramic. The particular firing temperature employed is dependent on the glass or ceramic which is used and does not form a part of the instant invention.

Referring now to FIGS. 4 through 16, FIG. 4 shows a sink 11 and faucet 12 formed of a composite 1, 1', 1" in accordance with this invention. Both of these articles could be formed for example of the composite 1 of the type shown in FIG. 1.

FIG. 5 shows a bath tub 13 formed of the composite 1 in accordance with FIG. 1. The bath tub of FIG. 5 includes a backing member 10 affixed to the composite 1 to provide added structural support. The backing member 10 may comprise as aforenoted wood, plastic or metal and may be affixed in any conventional manner. Preferably as shown the backing member 10 is a rigid polyurethane foam. The use of a rigid polyurethane foam makes the bath tub 13 of FIG. 5 relatively esay to fabricate by conventional techniques and the foam also provides significant structural support. FIG. 6 shows a cross section of the bath tub 13 along the line 6—6 of FIG. 5 illustrating the supporting relationship between the rigid foam backing member 10 and the glass or ceramic-to-metal composite 1 to which it is affixed.

Figure 7:
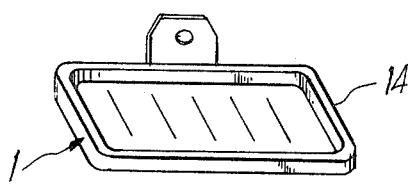
FIG. 7 is a perspective view of a soap dish.

FIG. 7 shows a soap dish 14 formed of the composite 1 of FIG. 1.

Figure 8:
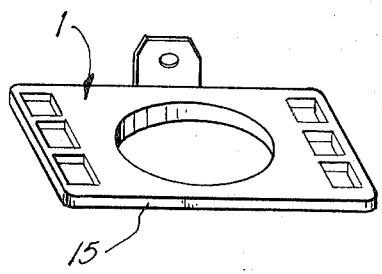
FIG. 8 is a perspective view of a tooth brush holder.

FIG. 8 shows a tooth brush holder 15 formed of the composite 1 of FIG. 1.

Figure 9:
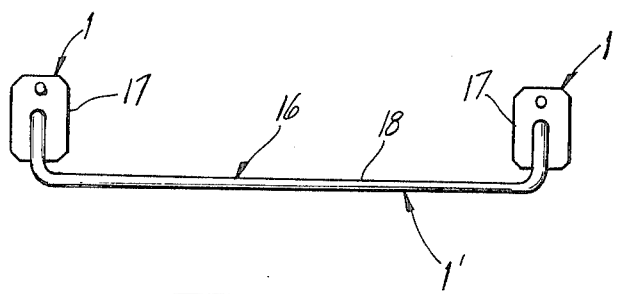
FIG. 9 is a perspective view of a towel holder.

FIG. 9 shows a towel holder 16 wherein the brackets 17 are formed of the composite 1 of FIG. 1 and wherein the towel bar 18 is coated about substantially its entire exposed surface with the glass or ceramic component 2 therefore corresponding substantially to the composite 1' of FIG. 2. The example illustrates that the articles in accordance with this invention may have portions formed of one type of composite and other portions formed of another type of composite.

Figure 10:
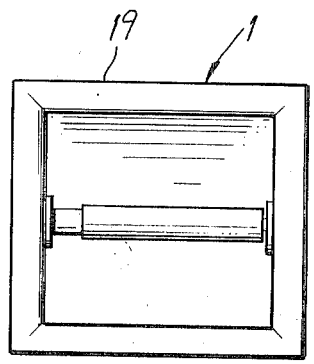
FIG. 10 is a perspective view of a toilet paper holder.
Figure 11:
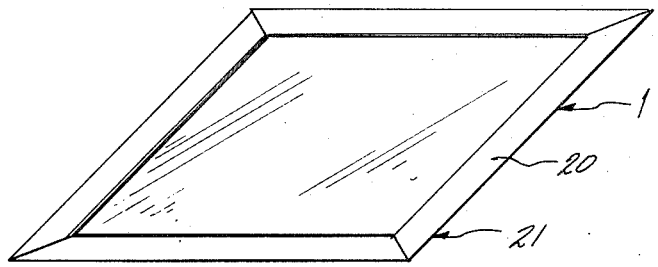
FIG. 11 is a perspective view of the decorative metal portion of an electrical lighting fixture.

FIG. 10 shows a toilet paper holder 19 formed of the composite 1 of FIG. 1.

FIGS. 11 and 12 illustrate the use of the composites 1, 1', 1" of this invention for the decorative metallic portions 20 of electrical fixtures 21. FIG. 11 shows the external portion of a recessed lighting fixture 21 and the decorative metal portion 20 of the fixture is formed of the composite 1 of FIG. 1.

FIG. 12 shows a lamp 22 of conventional design having a decorative metal portion 20 comprising a lamp base formed of the composite 1 of FIG. 1.

FIG. 13 is exemplary of a household utensil 22 employing the composites 1, 1', 1" of this invention. The composites 1, 1', 1" are particularly useful in kitchen utensils such as the pot 23 shown in FIG. 13. The pot 23 comprises a metal bowl 24 and a handle 25 attached thereto. The metal bowl 24 could be readily formed of the composite 1" of FIG. 2.

FIG. 14 shows yet another decorative article formed of the composites 1, 1', 1" in accordance with this invention, this article comprising a picture frame 26.

FIGS. 15 and 16 are illustrative of jewelry which may be formed of the composites 1, 1', 1" of this invention. FIG. 15 shows a ring 27 which would have substantially its entire exposed surface coated with a glass or ceramic, component 2 therefore, being formed of a composite 1' substantially similar to that of FIG. 2.

FIG. 16 shows a bracelet 28 formed of a composite 1" as in FIG. 3 wherein the metal component 3' itself comprises a composite metal having a decorative pattern 7 formed in one of the components of the metal composite.

FIGS. 4 through 16 therefore illustrate the wide variety of articles which can be formed of the composites in accordance with this invention. While specific composites were mentioned with respect to the various articles that was meant to be exemplary and not limitive of the invention. Any desired composite in accordance with this invention could be employed in any of the articles shown.

In summary, then, articles are provided in accordance with this invention having an aesthetically pleasing appearance and improved durability and resistance to corrosion and tarnishing by virtue of their being formed in part or in whole of a glass or ceramic-to-metal composite.

All of the compositions specified in this application by percentage are given in percentage by weight.

It is to be understood that this invention is not limited to the illustrations described and shown herein, which are deemed to be merely illustrative of the best modes of carrying out the invention, and which are suitable of modification of form, size, arrangement of parts and details of operation. The invention rather is intended to encompass all such modifications which are within its spirit and scope as defined by the claims.

What is claimed is:

1. An article having an aesthetically pleasing appearance and improved durability comprising:
   a backing member having a side and an opposing side; and
   a decorative metal composite affixed to at least one side of said backing member, said composite comprising,
   (A) at least one first metal component comprising a copper base alloy containing about 2 to 12% aluminum and the balance copper,
   (B) at least one second metal component of different composition from said first metal component bonded to said first metal component,
   (C) at least one decorative pattern present in at least one of said components, said decorative pattern extending throughout the thickness of said component so as to expose the other of said components,
   (D) an oxide layer formed over substantially the entire exposed surface of said first component, said oxide layer comprised of alumina in an amount of from 10 to 100% of its total thickness, and
   (E) a coating selected from the group consisting of glasses and ceramics which is in a glass or ceramic-to-metal bond and is formed over substantially the entire surface of said composite having said decorative pattern;
   said composite further affixed to said backing member so as to render visible said decorative pattern.

2. An article as in Claim 1 wherein the copper base alloy comprises about 2 to 10% aluminum, about 0.001 to 3% silicon, up to about 35% zinc and a grain refining element selected from the group consisting of iron up to about 4.5%, chromium up to about 1%, zirconium up to about 0.5%, cobalt up to about 1% and mixtures thereof and the balance essentially copper.

3. An article as in Claim 2 wherein the copper base alloy consists essentially of 2.5 to 3.1% aluminum, 1.5 to 2.1% silicon, 0.25 to 0.55% cobalt and the balance essentially copper.

4. An article as in Claim 2 wherein the copper base alloy consists essentially of 2.8 to 4.0% aluminum, 21 to 24.5% zinc, 0.1 to 1% cobalt and the balance essentially copper.

5. An article as in Claim 1 wherein said first component comprises at least 70% of the surface area of said surface of said composite having said decorative pattern.

6. An article as in Claim 1 wherein the backing member is selected from the group consisting of wood, plastics, and metals.

7. An article as in Claim 6 comprising a bath tub and wherein said backing member comprises a rigid polyurethane foam.

8. An article as in Claim 1 which comprises a plumbing fixture.

9. An article as in Claim 8 comprising a sink.

10. An article as in Claim 8 comprising a bath tub.

11. An article as in Claim 1 which comprises a bathroom fixture.

12. An article as in Claim 11 which comprises a soap dish.

13. An article as in Claim 11 which comprises a tooth brush holder.

14. An article as in Claim 11 which comprises a towel holder.

15. An article as in Claim 11 which comprises a toilet paper holder.

16. An article as in Claim 1 comprising the decorative metal portion of an electrical lighting fixture.

17. An article as in Claim 16 comprising a lamp base.

18. An article as in Claim 1 comprising the decorative metal portion of a household utensil.

19. An article as in Claim 1 comprising a picture frame.

20. An article as in Claim 1 comprising a piece of jewelry.

21. An article as in Claim 20 comprising a ring.

References Cited

UNITED STATES PATENTS

| | | | |
|---|---|---|---|
| 3,676,292 | 7/1972 | Pryor et al. | 161—196 |
| 3,360,349 | 12/1967 | Adomines | 29—195 G |
| 2,918,595 | 12/1959 | Cressman | 75—162 X |
| 2,640,904 | 6/1953 | Gaiser | 161—196 X |
| 3,694,273 | 6/1972 | Crane et al. | 75—162 X |
| 3,402,043 | 9/1968 | Smith | 75—162 X |
| 2,205,534 | 6/1940 | Lytle | 161—160 X |
| 2,034,562 | 3/1936 | Davis et al. | 75—162 X |
| 3,443,915 | 5/1969 | Wood et al. | 29—195 G |
| 3,259,491 | 7/1966 | Pryor | 75—162 |

GEORGE F. LESMES, Primary Examiner

W. E. BALL, Assistant Examiner

U.S. Cl. X.R.

29—191; 161—145, 160, 196; 117—45, 70 A, 70 C, 71 R, 71 M; 75—162; 4—187 R, 191; 63—2